(12) United States Patent
Kim

(10) Patent No.: US 7,575,087 B2
(45) Date of Patent: Aug. 18, 2009

(54) POWER TRAIN MOUNTING SYSTEMS FOR MOTOR VEHICLES

(75) Inventor: Hyo-Seok Kim, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 783 days.

(21) Appl. No.: 11/299,358

(22) Filed: Dec. 8, 2005

(65) Prior Publication Data

US 2006/0144631 A1    Jul. 6, 2006

(30) Foreign Application Priority Data

Dec. 21, 2004    (KR) .................... 10-2004-0109585

(51) Int. Cl.
*B60K 5/04*    (2006.01)
*B60K 5/12*    (2006.01)

(52) U.S. Cl. .................. 180/299; 180/291; 180/292

(58) Field of Classification Search ................ 180/291, 180/292, 295, 297, 299, 312; 267/292–294, 267/140.11, 140.3, 141
See application file for complete search history.

(56) References Cited

U.S. PATENT DOCUMENTS

| 1,698,453 | A | * | 1/1929 | Sardeson et al. ............ 180/312 |
| 4,240,517 | A | * | 12/1980 | Harlow et al. ............... 180/295 |
| 5,096,010 | A | * | 3/1992 | Ojala et al. ................ 180/68.3 |
| 5,129,479 | A | * | 7/1992 | Fujii et al. .................. 180/297 |
| 5,740,876 | A | | 4/1998 | Shimose et al. |
| 6,085,858 | A | * | 7/2000 | Wakana et al. .............. 180/300 |
| 6,155,372 | A | * | 12/2000 | Hirasaka .................... 180/297 |
| 6,386,309 | B1 | * | 5/2002 | Park .......................... 180/300 |
| 6,550,561 | B2 | * | 4/2003 | Dau et al. ................... 180/299 |
| 6,708,793 | B2 | * | 3/2004 | Witherspoon et al. ....... 180/291 |
| 2002/0033594 | A1 | * | 3/2002 | Yamamoto et al. .......... 280/781 |
| 2002/0166711 | A1 | * | 11/2002 | Witherspoon et al. ....... 180/291 |

FOREIGN PATENT DOCUMENTS

| DE | 69809644 T | 8/2003 |
| JP | 59-040946 | 3/1984 |
| JP | 05-301526 | 11/1993 |
| JP | 10-315789 | 12/1998 |
| JP | 2001-180295 | 7/2001 |
| JP | 2004-148843 | 5/2004 |

* cited by examiner

*Primary Examiner*—Christopher P Ellis
*Assistant Examiner*—Vaughn T Coolman
(74) *Attorney, Agent, or Firm*—Morgan, Lewis & Bockius LLP

(57) ABSTRACT

A power train mounting system includes a front mount, a rear mount, an engine mount, and a transmission mount. Installation heights and spring constants of each mount are predetermined such that the majority of the weight of the power train is supported by the front and rear mounts. Mounting axes of the engine mount, front mount, and rear mount are vertical while the mounting axis of the transmission mount is lateral. The transmission mount may include bridges which vary its spring constant during vehicle roll.

7 Claims, 5 Drawing Sheets

POWER TRAIN MOUNTING SYSTEMS FOR MOTOR VEHICLES

CROSS-REFERENCE TO RELATED APPLICATIONS

This application is based on and claims priority of Korean Patent Application No. 10-2004-0109585, filed on Dec. 21, 2004 with the Korean Intellectual Property Office, the disclosure of which is fully incorporated herein by reference.

FIELD OF THE INVENTION

The present invention relates to a power train mounting system for a motor vehicle. More specifically, the present invention relates to a power train mounting system that can support heavier engines.

BACKGROUND OF THE INVENTION

A power train, i.e. an engine-transmission assembly, for a motor vehicle is typically mounted to a power train frame structure that is in turn mounted to the motor vehicle frame. To function properly, power train mounting systems are configured to support the power train and to insulate the vehicle frame from power train noise and vibrations generated by the power train. Three-point and four-point principal axis of inertia mounting systems are well known in the art; these mounting systems support the power train at three or four locations and are positioned over the principal axis of inertia, which intersects the power train's center of gravity.

In conventional four-point mounting systems, an engine mount and a transmission mount support most of the load of the power train. The engine and transmission mounts, which serve as the two main mounts, are placed over the power train's principle axis of inertia to improve Noise, Vibration, and Harshness (NVH) levels. The front and rear portions of the power train are further supported by roll mounts, providing two additional support points, to control the vehicle's roll displacement. See U.S. Pat. No. 6,708,793, which is incorporated herein by reference in its entirety.

However, conventional principal axis of inertia four-point mounting systems are inadequate for supporting high performance and/or high power engines, e.g. V-6 engines, etc. These engines tend to be heavier and to generate a large torque; large vehicle roll displacement therefore results with increased inertia and engine output. A way to restrict the amount of roll displacement is to dramatically raise the spring constant of the roll mount. However, too high a spring constant will result in poor NVH performance when the vehicle is idling since the roll mounts will not be as effective in damping torque-related vibrations from the power train. Moreover, the spring constant of the roll mount is typically low in conventional principal axis of inertia four-point mounting systems. As a result, roll displacement becomes more and more amplified by action-reaction forces from the power train and roll mounts, respectively, with increasing engine output, and the roll mounts become compressed to the point where power train noise and vibrations can be readily felt by passengers during a vehicle start.

SUMMARY OF THE INVENTION

The present invention provides a power train mounting system having a structure somewhat akin to that of a principal axis of inertia four-point mounting system but much better adapted to various types of engines, including medium- to heavy-weight high-power engines, e.g., a four-cylinder in-line (I-4) engine, V-6 engine, etc. The mounting system according to the invention is primarily directed to a transversely mounted power train.

In embodiments of the present invention, the mounting system comprises an engine mount, a transmission mount, a front mount, and a rear mount. The engine mount is connected to the power train at connection point(s) positioned over the principal axis of inertia and through the engine and a side member of the vehicle body. The transmission mount is positioned over the principal axis of inertia and connected through the upper end of the transmission and a side member of the vehicle body. The transmission mount and engine mount are opposite each other so as to restrict the power train's roll displacement. The front and rear mounts are connected, respectively, to the front and rear of the power train through a sub-frame. Unlike conventional four-point mounting systems however, the present invention provides installation heights and spring constants of the engine mount and transmission mount such that the front and rear mounts become the primary load bearing mounts.

BRIEF DESCRIPTION OF THE DRAWINGS

For a better understanding of the nature and objects of the present invention, reference should be made to the following detailed description with the accompanying drawings, in which.

DETAILED DESCRIPTION OF THE PREFERRED EMBODIMENTS

Figure 1:
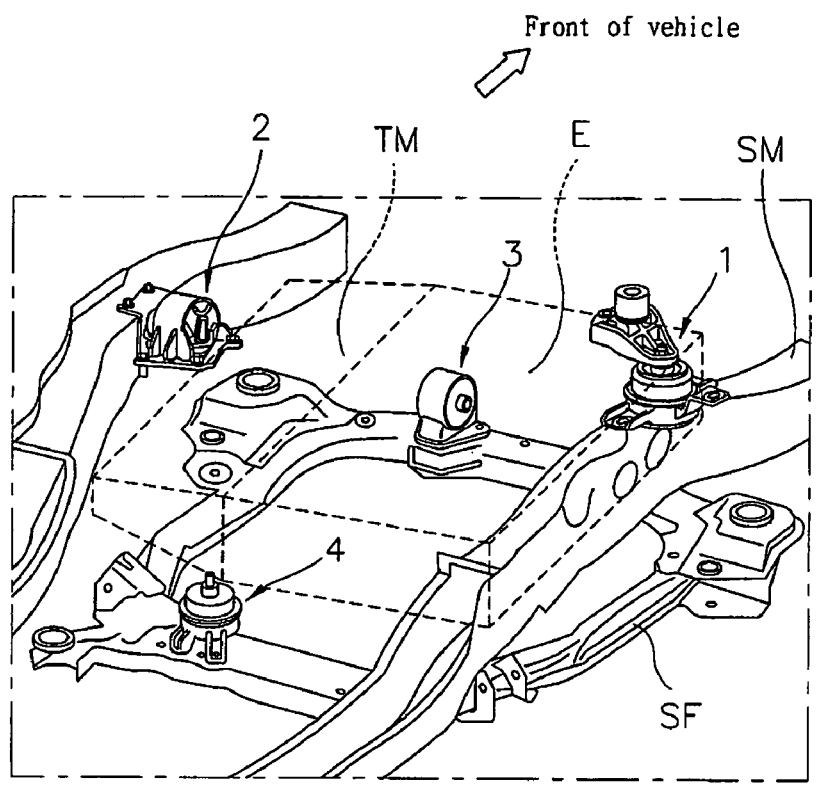
FIG. 1 shows a power train mounting system according to an embodiment of the present invention.
Figure 2:
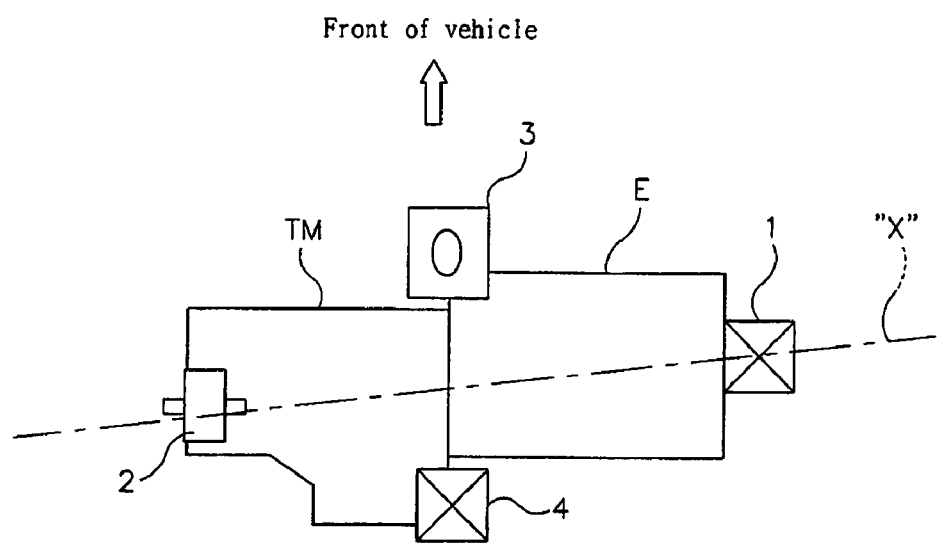
FIG. 2 is a top-down view of a power train mounting system according to an embodiment of the present invention.
Figure 3:
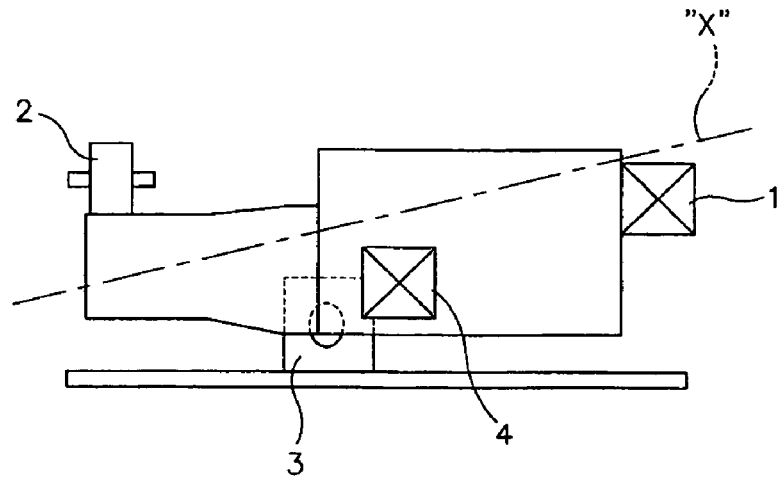
FIG. 3 is rear view of a power train mounting system according to an embodiment of the present invention.
Figure 4:
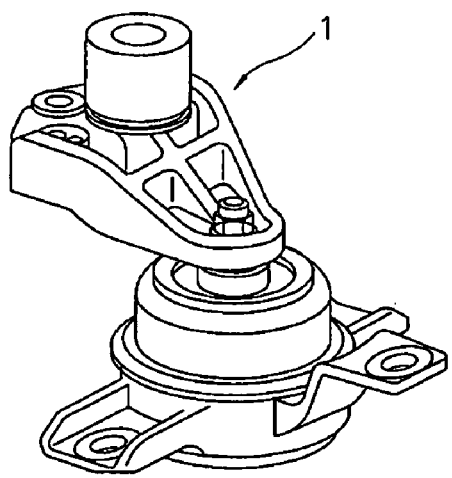
FIG. 4 is an enlarged view of the engine mount illustrated in FIG. 1.
Figure 5:
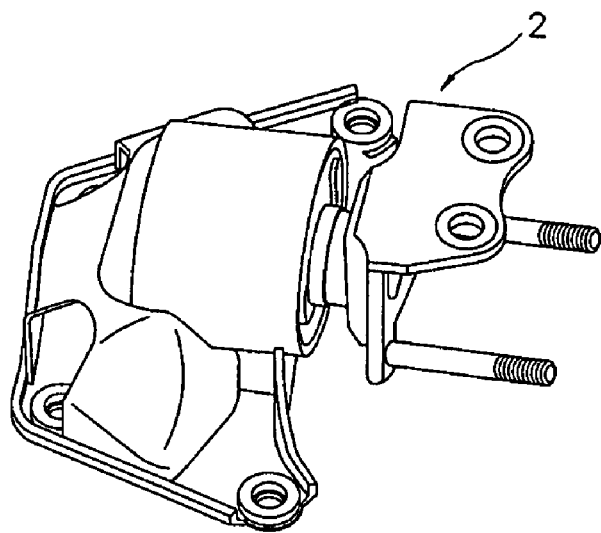
FIG. 5 is an enlarged view of the transmission mount illustrated in FIG. 1.
Figure 6:
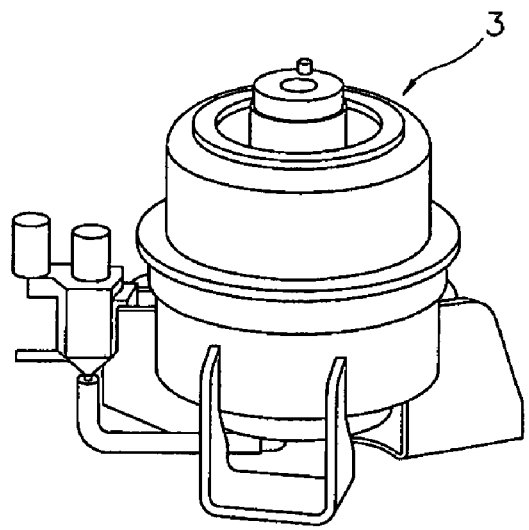
FIG. 6 is an enlarged view of the front mount illustrated in FIG. 1.
Figure 7:
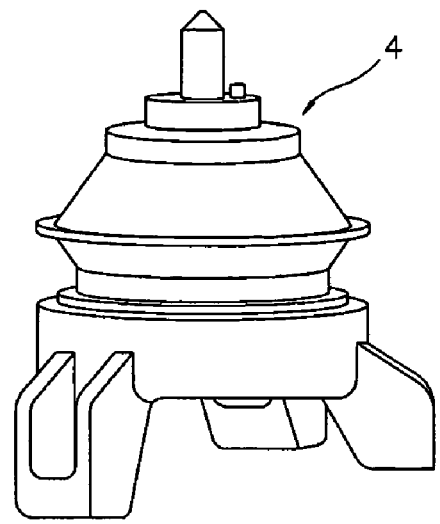
FIG. 7 is an enlarged view of the rear mount illustrated in FIG. 1.

A mounting system according to embodiments of the present invention comprises an engine mount, a transmission mount, a front mount, a rear mount, side members, and a subframe. Referring to FIG. 1, the sub-frame (SF) is located at a lower front portion of the vehicle. The engine mount 1 and transmission mount 2 are operably connected, directly or through one or more mechanisms known in the art, to opposing side members that are in turn mounted to the vehicle frame. As illustrated in FIGS. 1 and 2, the engine mount 1 and transmission mount 2 support the engine (E) and transmission (TM), respectively, and are positioned along the principle axis of inertia of the power train. As used herein, a power train is equivalent to an engine-transmission assembly.

In embodiments of the present invention, the mounting axis of engine mount 1 is vertically placed in relation to the vehicle body while the mounting axis of transmission mount 2 is laterally placed in relation to the vehicle body. The front mount 3 and rear mount 4 are fixed at the front and rear of the sub-frame (SF), respectively, to support the power train. The mounting axes of front and rear mounts (3 and 4) are vertically positioned in relation to the vehicle body.

Unlike conventional four-point mounting systems, the front and rear mounts (3 and 4) of the present invention are the primary load bearing mounts for supporting the power train. In one embodiment of the present invention, the front and rear amounts (3 and 4) support 75-85% of the overall weight of the power train, and have a spring constant value of approximately 20 kgf/mm so as to insulate the passenger compartment from noise and vibration generated by the power train. The engine mount 1 of the present invention is designed to support the remaining 15-25% of the power train load. Transmission mount 2, which mounts the power train to the vehicle frame through the upper end of the transmission (TM), serves as a roll mount and does not bear a substantial portion of the load of the power train.

Transmission mount 2 is installed between the sub-frame (SF) and the upper end of the transmission (TM). The location of transmission mount 2 facilitates the restriction of engine roll. Further, as transmission mount 2 is disposed on the principal axis of inertia, resistance against the vibration-generating force of the engine is relatively small, thereby improving the NVH function of the vehicle.

The spring constants of engine mount 1 and transmission mount 2 are lower than those of front and rear mounts 3 and 4. Therefore, the roll mode of the engine does not affect the pitch or the yaw, thus improving the NVH function. The laterally disposed mounting axis of transmission mount 2 is also beneficial in this respect.

Figure 8:
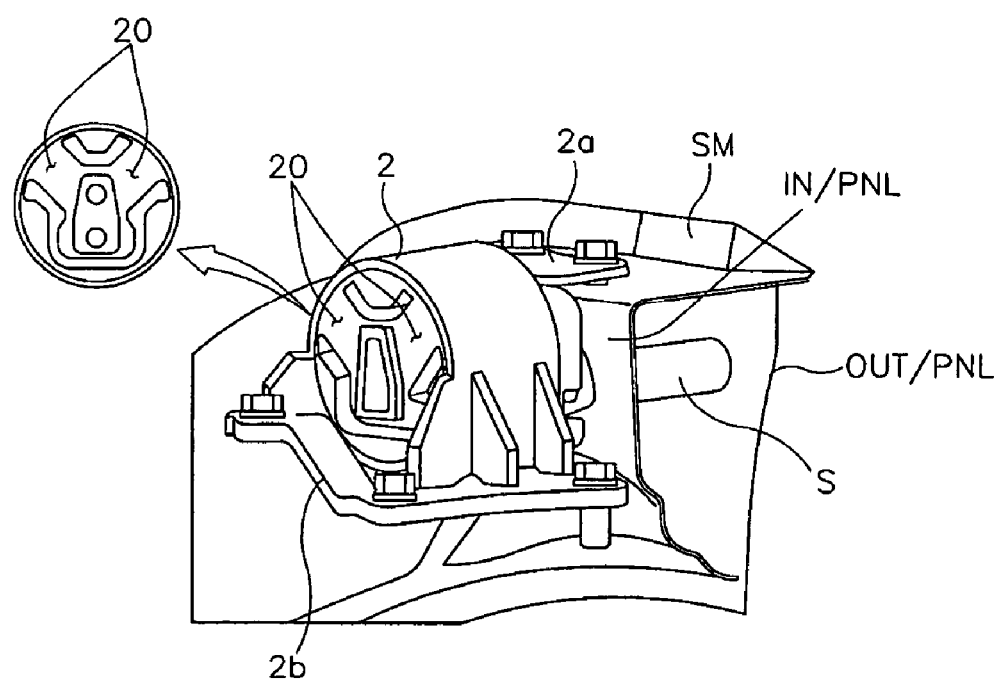
FIG. 8 is a perspective view of the transmission mount illustrated in FIG. 1.
Figure 9:
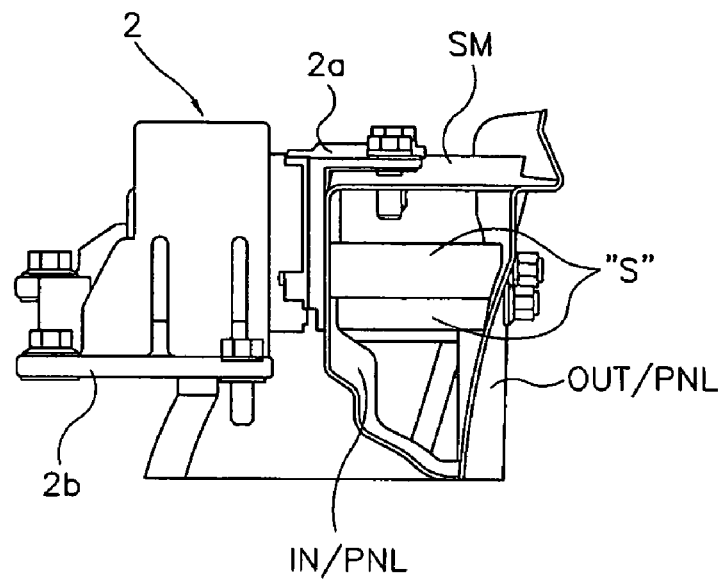
FIG. 9 is a front view of the transmission mount illustrated in FIG. 1.
Figure 10:
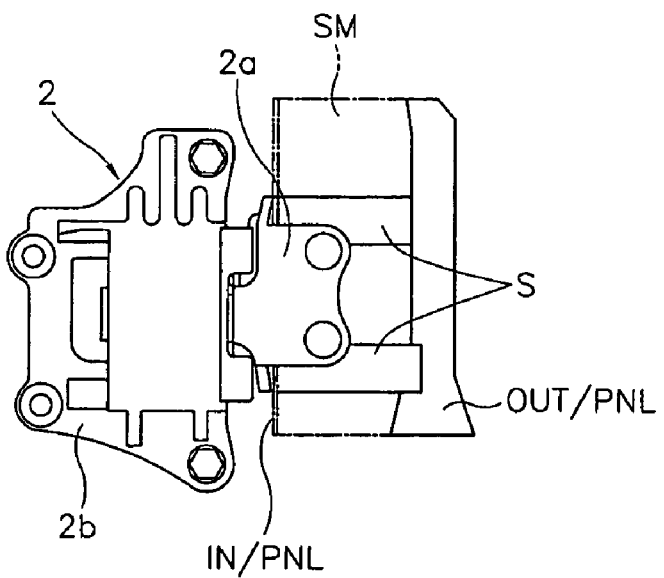
FIG. 10 is a top-down view of the transmission mount illustrated in FIG. 1.

The construction of transmission mount 2 according to embodiments of the present invention largely affects ride comfort during vehicle starts. Referring to FIGS. 8 to 10, transmission mount 2 has the shape of a bushing. The mounting axis of transmission mount 2 is disposed along the lateral direction of the vehicle. A plurality of bridges 20 are formed between an inner pipe and outer pipe in the radial direction of transmission mount 2.

The spring constant of transmission mount 2 in the anteroposterior direction of the vehicle should be at least 1.2 times the spring constant of transmission mount 2 in the vertical direction. The spring constant of transmission mount 2 in the lateral direction of the vehicle is preferably at most 0.5 times the spring constant of transmission mount 2 in its vertical direction.

If the power train rolls when the vehicle starts to move, the bridges deform and the spring constant of the transmission mount in the lateral direction gradually increases such that less engine noise reaches the passengers.

Transmission mount 2 is integrally equipped at one side thereof with a first mount bracket 2a which mounts to the upper end of the side member (SM) of the vehicle body. A second mount bracket 2b mounts another side of transmission mount 2 to the upper end of the transmission (TM).

The side member (SM) has a cylindrical spacer (S) between an inner panel and outer panel that make up the side member (SM). The spacer (S) supports first mount bracket 2a by means of screws.

For a manual transmission, front mount 3 supporting the front of the power train at the front of the sub-frame (SF) can be an ordinary bushing-shaped mount for merely supporting the load of the power train. For an automatic transmission, a semi-active mount can preferably be used as front mount 3 to lower the roll mode at idle and improve the NVH function thereby.

The semi-active mount is known in the art. A vacuum switch and two fluid chambers are formed in a liquid-filled sandwich-like mount. The vacuum switch turns to ON and OFF via a solenoid valve added at the outside of the mount.

During idling, the vacuum switch is turned ON and the vacuum is formed; the spring constant and the damping force decrease. During driving, the vacuum switch is turned into the OFF state; the spring constant and the damping force increase.

In order to apply the above power train mounting system into a medium-sized I-4 engine, the spring constants of front and rear mounts 3 and 4 are varied, which improves the NVH function during idling.

As apparent from the foregoing, there is an advantage in that the power train mounting system of the present invention can be used for both I-4 and V-6 engines, thereby supporting the power train with superior NVH characteristics.

Those skilled in the art will appreciate that the conceptions and specific embodiments disclosed in the foregoing description may be readily utilized as a basis for modifying or designing other embodiments for carrying out the same purposes of the present invention. Those skilled in the art will also appreciate that such equivalent embodiments do not depart from the spirit and scope of the invention as set forth herein.

What is claimed is:

1. A power train mounting system, comprising:
    an engine mount disposed at a first end of a principal axis of inertia of said power train between an engine and a first side member of a vehicle body;
    a transmission mount disposed at a second end of said principal axis of inertia of said power train between a transmission and a second side member of the vehicle body;
    a front mount disposed at a front end of said power train between a sub-frame and said power train; and
    a rear mount disposed at a rear end of said power train between a sub-frame and said power train;
    wherein installation heights and spring constants of said front mount, said rear mount, said engine mount, and said transmission mount are predetermined such that a majority of an overall weight of said power train is supported by said front mount and said rear mount;
    wherein a spring constant of said transmission mount in an anteroposterior direction of the vehicle is at least about 1.2 times a spring constant of said transmission mount in a vertical direction, and a spring constant of said transmission mount in a lateral direction of the vehicle is at most about 0.5 times the spring constant of said transmission mount in the vertical direction.

2. The mounting system as defined in claim 1, wherein said front mount and said rear mount support between about 75% and about 85% of the overall weight of said power train, and said engine mount supports between about 15% and about 25% of the overall weight of said power train.

3. The mounting system as defined in claim 1, wherein mounting axes of said engine mount, said front mount, and said rear mount are substantially vertical, and a mounting axis of said transmission mount is disposed substantially in a lateral direction of the vehicle body.

4. The mounting system as defined in claim 1, wherein said transmission is a manual transmission, and said front mount comprises a bushing-shaped mount.

5. The mounting system as defined in claim 1, wherein said transmission is an automatic transmission, and said front mount comprises a semi-active mount.

6. The mounting system as defined in claim 1, wherein a mounting axis of said transmission mount is disposed substantially in the lateral direction of the vehicle body, and said transmission mount further comprises a plurality of bridges.

7. The mounting system as defined in claim 6, further comprising a side member, said side member comprising:
   an inner panel;
   an outer panel; and
   a spacer between said inner panel and said outer panel;
   wherein said transmission mount further comprises:
      a first mounting bracket at a first side of said transmission mount; and
      a second mounting bracket at a second side of said transmission mount;
      and wherein said first mounting bracket is connected to said side member.

* * * * *